United States Patent [19]

Harding et al.

[11] 3,796,913

[45] Mar. 12, 1974

[54] DYNAMIC FOCUS WAVEFORM GENERATORS

[75] Inventors: Robert C. Harding; Lewis Leslie, both of Dallas; Edward H. Olsen, Richardson, all of Tex.

[73] Assignee: Seaco Computer-Display Incorporated, Garland, Tex.

[22] Filed: Feb. 28, 1973

[21] Appl. No.: 336,522

Related U.S. Application Data

[63] Continuation of Ser. No. 115,441, Feb. 16, 1971, abandoned.

[52] U.S. Cl. .............................. 315/31 R, 235/198

[51] Int. Cl. .......................................... H01j 29/56

[58] Field of Search... 315/31 TV, 31 R, 30, 27 TD; 235/197, 198, 135–139

*Primary Examiner*—Richard A. Farley

*Assistant Examiner*—J. M. Potenza

*Attorney, Agent, or Firm*—Kenneth R. Glaser

[57] ABSTRACT

Disclosed is waveform shaping network responsive to an incoming signal of varying magnitude and polarity for producing an output signal which waveform or slope is altered, the network including a differential amplifier coupled to the input terminal having a variable level constant current source coupled thereto, the respective outputs of the differential amplifier being coupled to a pair of transistors having their collector outputs coupled to the output terminal of the network, the emitter terminals of each of the transistors respectively coupled to a pair of variable resistance networks, each of the variable resistance networks having a plurality of parallel resistive paths including a fixed and variable resistor and an emitter follower transistor for selectively and sequentially coupling each of the parallel resistive paths to the emitter of the coupled transistor for varying the slope of the signals provided at the output terminal in response to the breakpoint or conduction level of each of the emitter follower transistors. The waveform shaping network is embodied in a pair of focus generators respectively coupled to horizontal and vertical position generators which produce output signals proportional to the horizontal and vertical excursion of the electron beam of a CRT system, the output signals from the focus generators thereafter being coupled through an amplifier to the focus means for effecting the dynamic focus of the electron beam as it engages in its excursions across the CRT tube face.

20 Claims, 3 Drawing Figures

*INVENTORS*
ROBERT C. HARDING
LEWIS LESLIE
EDWARD H. OLSEN

Kenneth R. Glaser
*ATTORNEY*

INVENTORS
ROBERT C. HARDING
LEWIS LESLIE
EDWARD H. OLSEN

Kenneth R. Glaser
ATTORNEY

DYNAMIC FOCUS WAVEFORM GENERATORS

This is a continuation, of application Ser. No. (115,441), filed (2-16-71), now abandoned.

This invention generally pertains to waveform shaping circuitry, more particularly to cathode ray tube systems employing waveform shaping networks, and even more particularly to focus generators for driving the electrostatic lens or magnetic focusing coil of CRT apparatus.

Cathode ray tube systems have long been employed to provide a visual representation of electrical effects, these systems generally consisting of three fundamental subsystems: (1) an electron gun for producing the electron beam; (2) an X-Y deflection system for diverting the electron beam in accordance with the information to be displayed; (3) a focusing system for assuring continuous focus of the beam during its excursion across the tube face; and (4) a fluorescent screen upon which the so-deflected and focused electron beam impinges.

Critical to the effective operation of the overall CRT system is the ability to focus or concentrate the electrons into a fine spot at the point of impingement on the screen. In practice, this focusing is generally effected by either an electrostatic lens or magnetic coil arrangement which generally controls the flow of electrons in the beam in the same way that optical lenses control the travel of light. For example, CRT systems utilizing magnetic focusing include both static and dynamic focus coils, the static coil initially determining the focus of the electron beam at the center of the screen, the dynamic coil thereafter adjusting the focus of the beam in response to excursions of this beam away from the center.

Consequently, the generator network which drives the dynamic focus coil (and thereby varies the magnetic flux to maintain the spot focus) must have an output signal waveform which effectively takes into consideration the amount of compensating flux change necessary to maintain the beam spot in focus in response to variations in the radial distance of the beam from the center of the CRT display. In practice, it has been determined that this output signal waveform should closely approximate an exponential curve for both positive and negative excursions of the beam (i.e., a parabola).

While various focus generators have previously been designed which produce the required output signal waveform, these prior art networks have generally been unsatisfactory for a variety of reasons. Among the disadvantages associated therewith is their inability to provide the necessary focus compensation when non-uniformities in the deflecting fields for positive and negative beam excursions are encountered. In addition, repeated adjustments of the waveform D.C. level must be maintained throughout the complete compensation procedure. Additionally, in order to obtain the approximate exponential or parabolic waveform required for effective dynamic correction, a separate viewing instrument, such as an oscilloscope, must be utilized by the operator during the dynamic alignment adjustment procedure. Considerable difficulty has also been encountered in attempting to generate the overall compensation waveform by initially establishing the drive signal waveform with reference to the desired focus at the peripheral portions of the screen and then, by a trial and error basis, adjusting this signal waveform as the center of the screen is approached.

It is therefore a primary object of the invention to provide a new and improved technique for effectively controlling the waveform of an electrical signal.

It is a further object of the invention to provide a new and improved generator for driving the focus lens or coil arrangement of a CRT.

It is a still further object of the invention to provide a focus generator which is capable of effecting independent focus compensation for positive and negative beam excursions.

It is an even still further object to facilitate the continual focusing of an electron beam of a CRT without the necessity for repeated adjustments or axuiliary viewing equipment.

In accordance with these and other objects, features, and advantages, the present invention is directed to a waveform shaping network responsive to an incoming signal of varying magnitude and polarity. A pair of signals proportional to the absolute magnitude of the incoming signal and respectively representing the polarity of the incoming signal have their slopes altered in response to variations in resistance of a coupled network so that a resultant output signal produced by one of these two signals varies approximately exponentially with respect to the incoming signal. The slope control is effected by a plurality of parallel resistive paths, each adapted to be inserted in response to the conduction of an associated emitter follower transistor. In accordance with a specific feature of the invention, the incoming signal to the waveform shaping network is representative of the distance and direction of the excursion of the electron beam of a CRT display, the output signal from the network driving the electrostatic or magnetic focus means of the CRT apparatus.

For a more complete understanding of the invention, and for further objects, advantages and features thereof, reference may now be had to the following detailed description taken in conjunction with the accompanying drawings, in which.

Figure 1:
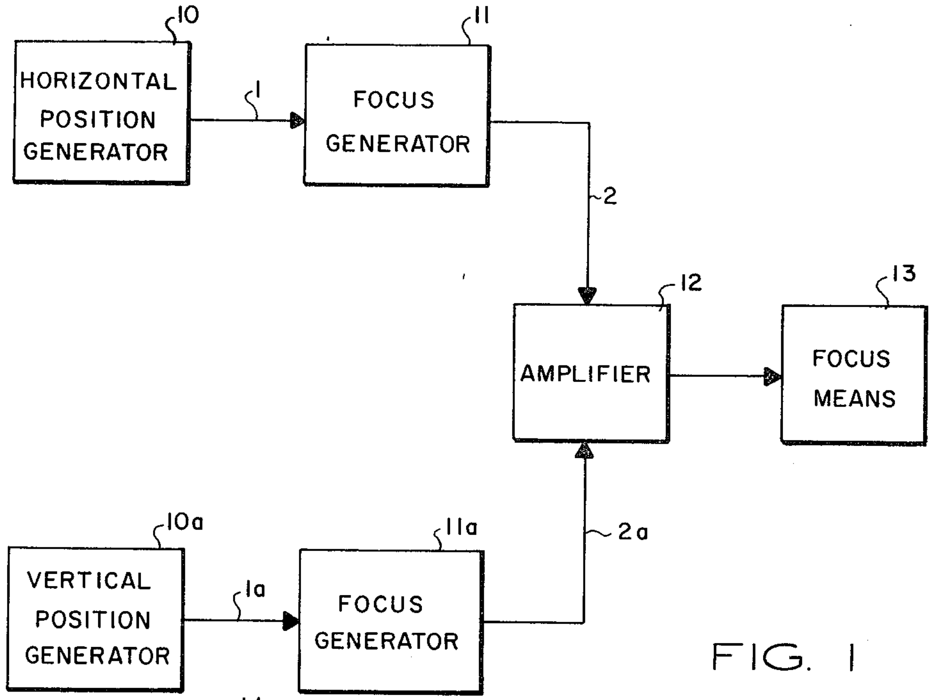
FIG. 1 is an overall block diagram of the focusing arrangement of a CRT display employing the focus generators of the present invention.

Referring now to FIG. 1, a pair of horizontal and vertical position generators 10 and 10*a* are respectively coupled to focus generators 11 and 11*a*, which focus generators embody the network of the present invention. These position generators 10 and 10*a* are effective to respectively produce output signals 1 and 1*a* directly proportional to the horizontal ($+x$ or $-x$) and vertical ($+y$ or $-y$) excursion of the beam spot from the center of a CRT display screen. Thus, output signal 1 may be a positive or negative signal (indicating a $+a$ or $-x$ beam excursion), the magnitude of the signal 1 being proportional to the actual distance of the spot along the $x$-axis from the center of the screen. Similarly, signal 1a is representative of the magnitude and direction of the beam excursion in the vertical ($+y$ or $-y$) direction. Various types of circuitry known in the art may be utilized for the means 10 and 10*a* and may, for example, be circuitry directly coupled to the output of the deflection amplifier or the deflection generator of the CRT apparatus.

Since the output signals 1 and 1*a* are approximately linearly proportional to the radial distance of the beam excursion across the tube face. and since any adjustment that must be effected in the focusing of the beam must vary approximately exponentially thereof, focus generators 11 and 11*a* are respectively provided to translate the linear signals 1 and 1a into output signals 2 and 2*a*, which waveforms approximate the desired exponential drive signals. These drive signals are thereafter coupled in amplifier means 12, the output of which is coupled to focus means 13. When a magnetic focusing scheme is utilized in the CRT apparatus, the focus means 13 is generally a dynamic magnetic focus coil of the type known in the art, the amplifying means 12 also converting the input voltage signals 2 and 2*a* to current signals for driving the magnetic coil 13. Alternatively, the focus means 13 may be an electrostatic lens arrangement driven by an output voltage from the amplifier 12.

Figure 2:
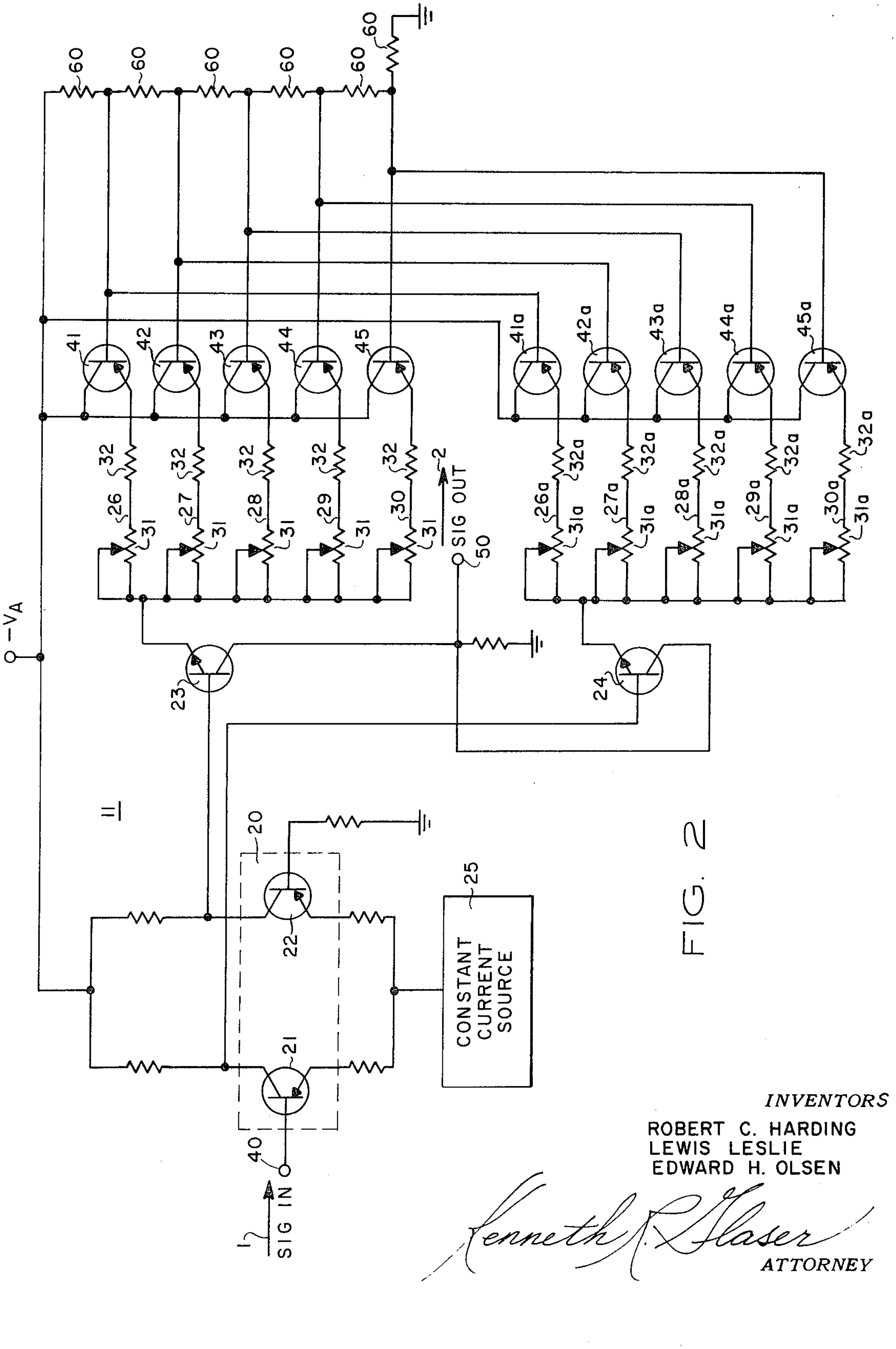
FIG. 2 is a circuit schematic of the detail of the focus generator.

Referring now to FIG. 2, there is illustrated the details of the focus generator embodying the network of the present invention. For convenience, specific reference is made to the focus generator 11 for processing the horizontal position signals 1, it being understood that an identical network is embodied in the focus generator 11*a* for processing the vertical position signals 1*a*.

Accordingly, the position signal 1 is coupled to the input of a differential amplifier 20 comprising PNP transistors 21 and 22 and associated bias and load resistors thereof. The differential amplifier 20 is effective to respectively produce a pair of output signals coupled to the input to the transistors 23 and 24, which output signals indicate the polarity or sign of, and are directly proportional to the absolute magnitude of the value of, the input signal 1. Thus, for the circuit illustrated, when the signal 1 increases in the positive direction (representing an excursion of the electron beam in the $+x$ direction, for example), transistor 23 will conduct as a consequence of the decrease in conduction of transistor 21 and the increase in conduction of transistor 22. Similarly, an increase of the signal 1 in the negative direction (representing a beam excursion in the $-x$ direction, for example), turns on transistor 24 in response to the increased conduction of transistor 21 and the corresponding decrease in conduction of transistor 22. Thus, a pair of output signals are derived from the means 20 which are representative of the magnitude and direction of the input signal 1, and are thus indicative of the extent and direction of the beam excursion from the center of the CRT screen.

Differential amplifier 20 has a constant current source 25 coupled thereto, which current source preferably has a current level adjustment associated therewith to establish the D.C. operating point. Ideally, the network 20 is balanced, there being substantially identical outputs from the transistors 21 and 22 during the absence of an input signal 1. It is understood, of course, that the differential amplifier 20 is just one type of network that may be utilized to provide a pair of output signals representative of the magnitude and direction of the input signal 1. In addition, it is understood by those skilled in the art that the transistors 21 and 22 may also be NPN transistors (with appropriate change in the polarity of supply potential $V_A$) in which event positive and negative cycles of the input signal 1 would respectively turn on transistors 24 and 23.

As a consequence of the variation of the signal 1, an output voltage signal 2 is provided at the output terminal 50, this output signal being the result of either the conduction of transistor 23 or that of transistor 24 depending upon the polarity of the input signal 1. Preferably, transistors 23 and 24 have substantially identical characteristics and are so biased as to be nonconducting when there is an absence of input signal 1 at the input terminal 40. Thus, since an absence of signal 1 indicates that the electron beam of the CRT is essentially at the $y$-axis (no or minimum excursion in the $x$-direction), there will be an absence of output signal 2 at the terminal 50, and no drive signal will be provided to focus means 13. Transistors 23 and 24 thus serve to isolate the effect of the network 11 from the amplifier 12 and focus coil 13 during this condition.

Effective waveshaping of the output signals from either the transistor 23 or 24 (and consequently the output signal 2) is effected by a pair of networks of parallel resistive paths 26–30 (26*a*–30*a*) respectively coupled to the emitter terminal of each of these transistors. Each of the resistive paths, when selectively inserted, reduce the overall net resistance to the output current from transistor 23 or 24, and correspondingly causes an increase in the slope of the output signal 2. The selective insertion of each of these resistive paths is effected by the sequential conduction of emitter follower transistors 41–45 (41*a*–45*a*), which, in turn, conduct in response to an increase in conduction of transistor 23 or 24. Each resistive path therefore introduces variable resistance 31 (31a) and fixed resistance 32 (32*a*).

Figure 3:
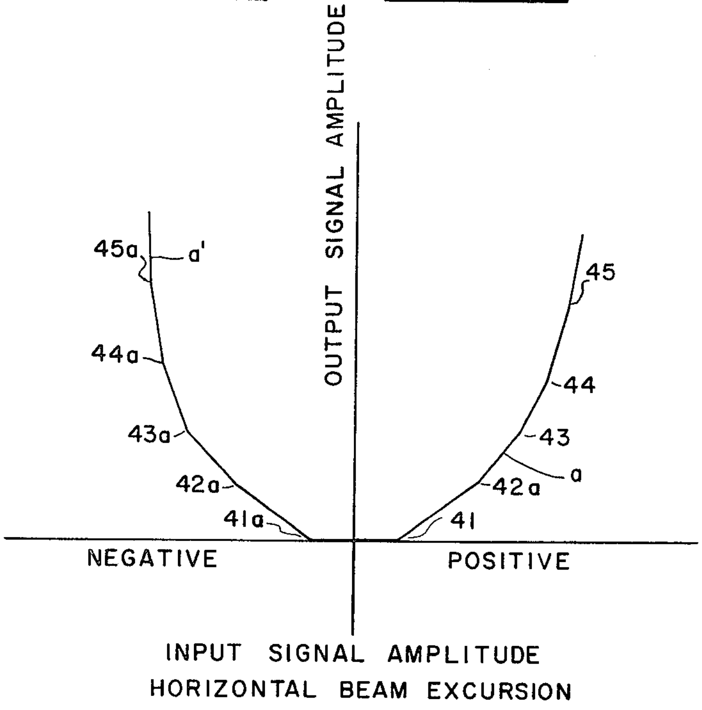
FIG. 3 is a plot of the waveform of the output signal from the generator shown in FIG. 2 illustrating the effective slope control thereof.

The voltage level ("breakpoint level") at which each of these transistors 41–45 (or 41*a*–45*a*) will conduct is mutually established by the values of the voltage divider string provided by the resistors 60. In this manner, the output signal 2 at the output terminal 50 is translated to a waveshape generally represented in FIG. 3 by the exponential curves a and $a'$. It is to be observed that the number of breakpoints of the curves a and $a'$ are determined by the number of resistive paths which are introduced in response to the conduction of the associated emitter follower transistors, and are marked on the graph by reference to the transistor which begins conduction. Thus, the number of breakpoints may be increased or decreased by increasing or decreasing the number of parallel resistive paths and circuitry associated therewith. In the example illustrated, five breakpoints (resistive paths) are provided for both positive and negative excursions of the beam. It is understood of course that more or less breakpoints may be utilized and, if desired, a different number of breakpoints may be utilized for generation of curve $a$ or $a'$.

The slope of the curve of the output signal after the breakpoint is then determined by the added value of the resistance in that so introduced path. It is to be noted that each slope can be controlled by adjusting adjustable resistors or potentiometers 31 (31*a*). As a particular feature of the invention, the slope of the waveform of the output signal from either transistor 23 or transistor 24 (thus curve $a$ or $a'$) can be independently adjusted. Thus, adjustment available for independent focusing of the electron beam for positive and negative excursions of this beam, thereby enabling independent compensation when non-uniformities in the deflecting fields for positive and negative beam excursions are encountered.

In operation, initial D.C. level adjustment is effected by adjusting the constant current source 25 so that both transistors 23 and 24 are just below their conduction points when there is an absence of an input signal 1 at the input terminal 40. This adjustment, of course, assures a zero output signal 2 (and consequently no dynamic focus adjustment) when the CRT beam is at the center of the screen. The desired focus compensation can then be established by appropriately adjusting the potentiometers 31 to increase or decrease the slope of the output signal 2 (curve *a* of FIG. 3) at each breakpoint level as the input signal 1 increases in the positive direction (positive excursions of the beam). This compensation is therefore effected from the zero crossing point outward. In similar manner, potentiometers 31a may be adjusted to establish the desired slope characteristics of the output signal 2 (curve *a'* of FIG. 3) for negative excursions of the beam along the *x*-axis. Appropriate focus compensation has now been effected for subsequent information to be displayed on the face of the CRT screen. As pointed out above, a similar arrangement is provided within the focus generator 11*a* to provide the required compensation for focusing of the electron beam during the positive or negative excursion thereof in the *y*-direction. The output signals from focus generators 11 and 11*a* are then combined in amplifier means 12, the output of which drives the magnetic or electrostatic focus means 13.

Various modifications to the disclosed preferred embodiment, as well as alternate embodiments, may become apparent to one skilled in the art without departing from the scope and spirit of the invention as defined by the appended claims.

What is claimed is:

1. Signal waveform shaping circuitry, comprising:

a. first means comprising a differential amplifier responsive to an incoming signal of varying magnitude and polarity for producing a pair of output signals, each of said output signals being respectively representative of the magntidue of the positive and negative excursions of said incoming signal, b. second means coupling the said pair of output signals to a common output terminal for producing a third signal at said common output terminal representative of the absolute magnitude of either one of said pair of output signals, and c. third means coupled to said second means for altering the slope of said third signal, said third means comprising a plurality of parallel resistive paths selectively coupled to said second means for varying the overall resistance of said second means, thereby to alter the slope of said third signal in response to said resistance change.

2. The circuitry as defined by claim 1 wherein said second means is a pair of transistors having their respective outputs coupled to said common output terminal, the said pair of output signals being respectively applied to the inputs of said pair of transistors.

3. The circuitry as defined in claim 1 wherein each of said resistive paths includes a resistor and transistor switch, the conduction of the transistor switch associated with each resistive path providing said selective coupling to said second means.

4. The circuitry as defined by claim 2 wherein the said pair of output signals are respectively coupled to the base input terminals of said pair of transistors, the collector output terminals of said transistors being respectively coupled to said common output terminal, and wherein said third means comprises a pair of parallel resistive path networks, each of said networks respectively coupled to the emitter terminals of said pair of transistors and including at least two parallel resistive paths adapted to be sequentially coupled to the respective emitter terminal.

5. The circuity as defined in claim 4 wherein each of said parallel resistive paths comprises a first resistor of fixed value, a second resistor of variable resistance and an emitter follower transistor, the selective conduction of said emitter follower transistor coupling its associated resistive path with the said emitter terminal.

6. The circuitry as defined in claim 5 wherein said differential amplifier has a constant current source coupled thereto.

7. The invention as defined by claim 6 wherein said constant current source has a variable current level adjustment associated therewith.

8. An electronic network for varying the slope of an output signal from said network in response to an incoming signal of varying magnitude and sign, comprising:

a. differential amplifier means having a pair of output terminals, said differential amplifier means being responsive to said incoming signal for producing signals at said pair of output terminals, the signal at one of said output terminals being representative of and proportional to the absolute magnitude of said incoming signal during its positive cycle, the signal at the other output terminal being represenative of and proportional to the absolute magnitude of said incoming signal during its negative cycle.

b. first and second transistors respectively coupled to the said pair of output terminals from said differential amplifier means, said pair of transistors having their collector outputs coupled to a common output terminal, c. first variable resistance network coupled to the emitter terminal of one of said transistors, said first variable resistance network comprising a plurality of parallel resistive paths coupled to said emitter terminal of said one transistor, each of said parallel resistive paths comprising resistive means and an emitter follower transistor, the conduction of which selectively couples the resistive means to the emitter terminal of said one transistor, and d. second variable resistance network coupled to the emitter terminal of the other transistor, said second variable resistance network comprising a plurality of parallel resistive paths coupled to the emitter terminal of said other transistor, each of said parallel resistive paths comprising resistive means and an emitter follower transistor, the conduction of which selectively couples the resistive means to the emitter of said other transistor.

9. The network as defined in claim 8 wherein the base terminal of each emitter follower transistor is coupled to a voltage divider string for respectively establishing the conduction level of each emitter follower transistor.

10. The network as defined in claim 9 further including a variable resistor within each of said parallel resistive paths.

11. The network as defined in claim 10 further including a constant current source coupled to said differential amplifier means, said constant current source having a variable current level adjustment associated therewith.

12. In a cathode ray tube system of the type including means for producing and directing an electron beam at a display screen, means for deflecting said beam in a horizontal and vertical direction across said screen, and means for focusing said beam as it is so deflected, the improvement comprising:

a. a position generator for producing a position signal representative of the deflection of said beam, said position signal being of varying magnitude and polarity respectively representing the distance and direction of said deflection, b. generator means coupled to said position generator for producing an output compensation signal having a waveform suitable for focusing said electron beam as it is deflected, said generator means comprising (i) first means comprising a differential amplifier responsive to said position signal for producing a pair of output signals, each of said output signals being respectively representative of the magnitude of the positive and negative excursions of said incoming signal, (ii) second means coupling the said pair of output signals to a common output terminal for producing a third signal at said common output terminal representative of the absolute magnitude of either one of said pair of output signals, and (iii) third means coupled to said second means for altering the slope of said third signal, said third means comprising a plurality of parallel resistive paths selectively coupled to said second means for varying the overall resistance of said second means, thereby to alter the slope of said third signal in response to said resistance change, c. said third signal being coupled to said focusing means.

13. The improvement as defined by claim 12 wherein said focusing means is a magnetic coil.

14. The improvement as defined by claim 12 wherein said second means is a pair of transistors having their respective outputs coupled to said common output terminal, the said pair of output signals being respectively applied to the inputs of said pair of transistors.

15. The improvement as defined by claim 12 wherein each of said resistive paths includes a resistor and transistor switch, the conduction of the transistor switch associated with each resistive path providing said selective coupling to said second means.

16. The improvement as defined in claim 14 wherein the said pair of output signals are respectively coupled to the base input terminals of said pair of transistors, the collector output terminals of said transistors being respectively coupled to said common output terminal, and wherein said third means comprises a pair of parallel resistive path networks, each of said networks respectively coupled to the emitter terminals of said pair of transistors and including at least two parallel resistive paths adapted to be sequentially coupled to the respective emitter terminal.

17. The improvement as defined by claim 16 wherein each of said parallel resistive paths comprises a first resistor of fixed value, a second resistor of variable resistance and an emitter follower transistor, the selective conduction of said emitter follower transistor coupling its associated resistive path with the said emitter terminal.

18. The improvement as defined by claim 17 wherein said differential amplifier has a constant current source coupled thereto.

19. The improvement as defined by claim 18 wherein said constant current source has a variable current level adjustment associated therewith.

20. A focus compensation network for incorporation in a cathode ray tube system of the type including means for directing an electron beam at a display screen, means for deflecting said beam in a positive and negative horizontal and vertical direction across said screen, and means for focusing said beam as it is so deflected, the focus compensation network comprising:

a. a position generator for producing a position signal representative of the positive and negative deflection of said beam, b. an absolute value generator for producing an output signal at an output terminal, said output signal being representative of the absolute magnitude of said position signal irrespective of the polarity of said position signal, said absolute value generator comprising:

i. first means comprising a differential amplifier responsive to said position signal for producing a pair of signals respectively representative of the magnitude of the positive and negative excursions of said position signal, ii. second means comprising a pair of current sources coupling said pair of signals from said first means to said otutput signal representative of the absolute magnitued of either one of said pair of signals, and c. a pair of networks for altering the slope of said output signal, said pair of networks respectively coupled to said pair of current sources, each network comprising a plurality of parallel resistive paths, each path including a resistor and a transistor, all of the transistors in the paths of both of said networks being of the same type (NPN or PNP).

* * * * *

UNITED STATES PATENT OFFICE
CERTIFICATE OF CORRECTION

Patent No. 3,796,913 Dated March 12, 1974

Inventor(s) Robert C. Harding, Lewis Leslie, and Edward H. Olsen

It is certified that error appears in the above-identified patent and that said Letters Patent are hereby corrected as shown below:

Column 1, Line 59, "+a" should be --+x--;

Column 4, Line 37, "mutually" should be --initially--;

Column 4, Line 64, "adjustment available" should be --adjustment is available--.

Signed and sealed this 10th day of September 1974.

(SEAL)
Attest:

McCOY M. GIBSON, JR.
Attesting Officer

C. MARSHALL DANN
Commissioner of Patents